(12) United States Patent
MacNeille et al.

(10) Patent No.: US 8,649,533 B2
(45) Date of Patent: Feb. 11, 2014

(54) EMOTIVE ADVISORY SYSTEM ACOUSTIC ENVIRONMENT

(75) Inventors: Perry Robinson MacNeille, Lathrup Village, MI (US); Oleg Yurievitch Gusikhin, West Bloomfield, MI (US); Kacie Alane Theisen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 921 days.

(21) Appl. No.: 12/572,364

(22) Filed: Oct. 2, 2009

(65) Prior Publication Data

US 2011/0083075 A1    Apr. 7, 2011

(51) Int. Cl.
*H03G 3/20* (2006.01)
*H04R 5/02* (2006.01)

(52) U.S. Cl.
USPC .......................................... 381/110; 381/302

(58) Field of Classification Search
USPC .................. 381/92, 310; 348/14.01–14.16
See application file for complete search history.

(56) References Cited

U.S. PATENT DOCUMENTS

| 6,249,720 | B1 * | 6/2001 | Kubota et al. | 701/1 |
| 2001/0038698 | A1 * | 11/2001 | Breed et al. | 381/86 |
| 2008/0269958 | A1 | 10/2008 | Filev et al. | |
| 2009/0022330 | A1 * | 1/2009 | Haulick et al. | 381/57 |
| 2010/0217590 | A1 * | 8/2010 | Nemer et al. | 704/233 |
| 2011/0004481 | A1 * | 1/2011 | Jones | 705/1.1 |

* cited by examiner

*Primary Examiner* — Brian Ensey
*Assistant Examiner* — Norman Yu
(74) *Attorney, Agent, or Firm* — Jennifer M. Stec; Brooks Kushman P.C.

(57) ABSTRACT

An emotive advisory system for use by one or more occupants of an automotive vehicle includes a directional speaker array, and a computer. The computer is configured to determine an audio direction, and output data representing an avatar for visual display. The computer is further configured to output data representing a spoken statement for the avatar for audio play from the speaker array such that the audio from the speaker array is directed in the determined audio direction. A visual appearance of the avatar and the spoken statement for the avatar convey a simulated emotional state.

17 Claims, 4 Drawing Sheets

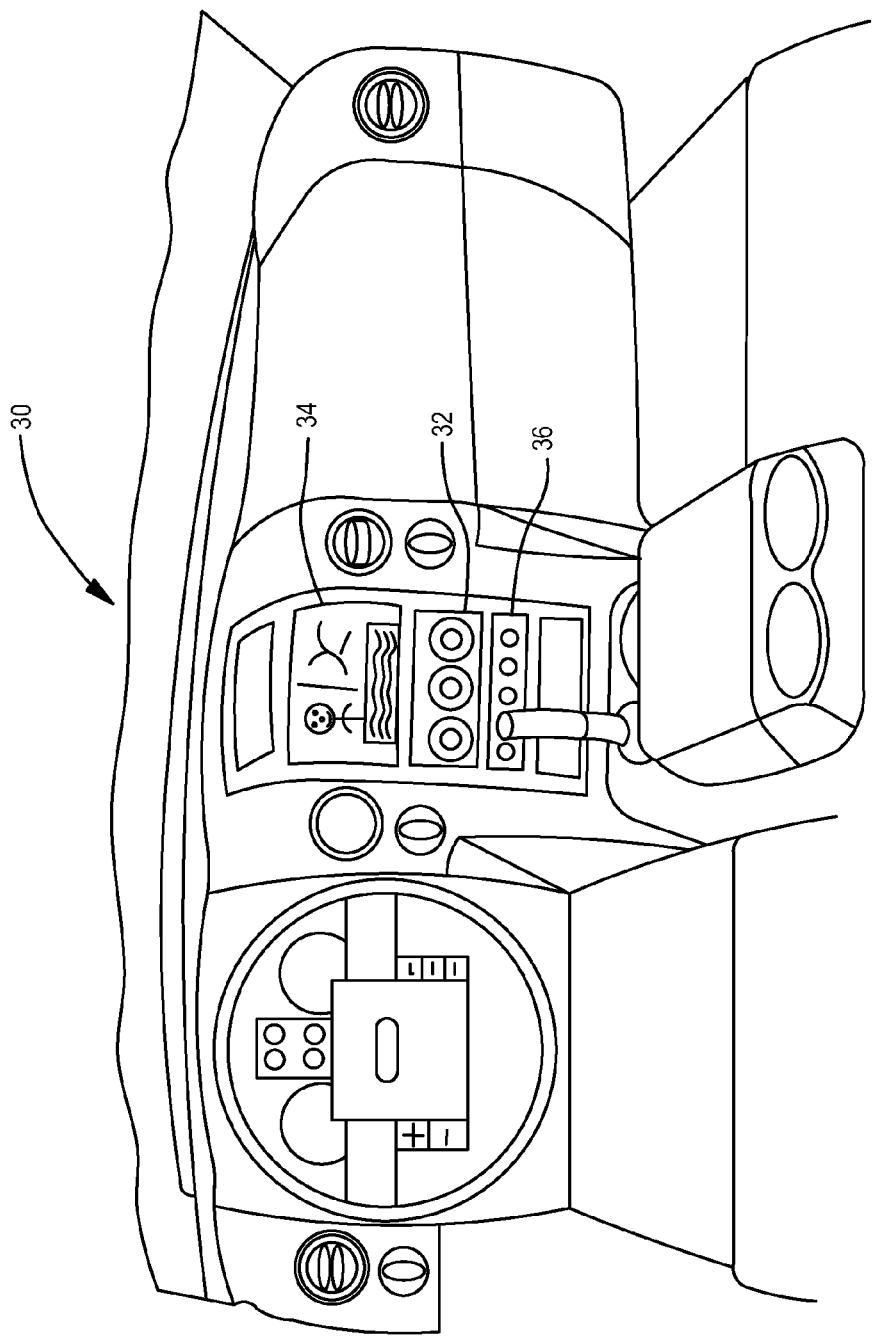

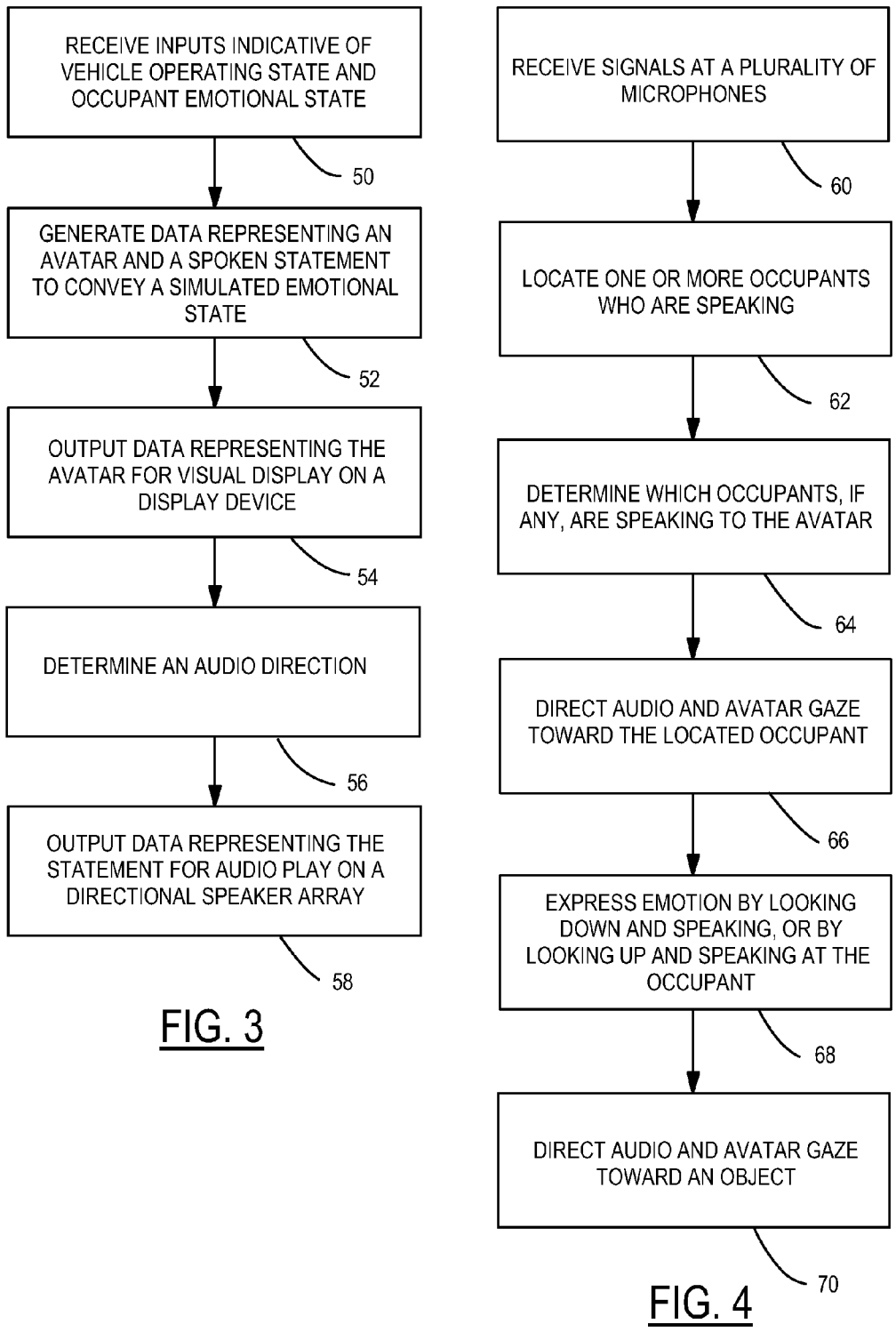

EMOTIVE ADVISORY SYSTEM ACOUSTIC ENVIRONMENT

BACKGROUND

1. Technical Field

The invention relates to an emotive advisory system (EAS) for use by one or more occupants of an automotive vehicle.

2. Background Art

The vehicle dashboard continues to grow increasingly complex. As new systems are added and existing systems become more complex there is added competition for space on the dashboard and the controls are increasingly difficult to use. New systems include navigation systems, MP3 players, hands free cell phone and satellite radio; while old systems that are becoming more complex are FM/AM radio, HVAC (heat, ventilation and air conditioning), vehicle lighting and drivetrain controls.

Increasingly there is a move away from conventional controls to human interfaces to manage this complexity. In one approach, multiple interfaces in an automotive vehicle are consolidated into a single interface in an emotive advisory system (EAS).

In general, the emotive advisory system (EAS) for the automotive vehicle emotively conveys information to an occupant. The system receives input indicative of an operating state of the vehicle, transforms the input into data representing a simulated emotional state and generates data representing an avatar that expresses the simulated emotional state. The avatar may be displayed. The system may receive a query from the occupant regarding the emotional state of the avatar, and respond to the query. An example emotive advisory system and method is described in U.S. Pub. No. 2008/0269958.

Systems like EAS can consolidate all of these controls into a single interface that is also more appealing to the occupants and opens new prospects for a vehicle persona. However, speech/avatar oriented systems like EAS also have new requirements. They need microphones built into the vehicle that allow them to hear what occupants in the vehicle are saying and to know where they are speaking from; and speakers that give the same sense of directionality as a human speaker.

Another aspect of the sound system is the creation of sound that seems like a human voice's and is consistent with the avatar's position with respect to objects in the rendered space, emotion, prosody, pronunciation and gestures. The objective of the sound system is to make it sound like the avatar is actually in the vehicle talking to the occupants. By doing so, it makes it possible to develop dialog that assumes the avatar is human, causing the occupants to treat the avatar with politeness and speak to it in a natural voice. This in turn increases the recognition rate and helps to develop an emotional bond between the avatar and the vehicle occupants.

EAS also needs to use several voices. It is helpful to the listener if those voices are in different locations in the vehicle. For example, when the news is read the voice may be useful to disembody the news from the avatar.

Background information may be found in U.S. Pub. No. 2008/0269958.

SUMMARY

In one embodiment of the invention, an emotive advisory system for use by one or more occupants of an automotive vehicle is provided. The system comprises a directional speaker array, and a computer. The computer is configured to receive input indicative of an operating state of the vehicle and input indicative of an emotional state of an occupant. The computer is further configured to generate (i) data representing an avatar having an appearance and (ii) data representing a spoken statement for the avatar having at least one speech characteristic. The appearance and the at least one speech characteristic convey a simulated emotional state of the avatar to the occupant. The simulated emotional state depends on at least one of the operating state of the vehicle and the emotional state of the occupant. The computer is further configured to output the data representing the avatar for visual display, and determine an audio direction. The computer is further configured to output the data representing the statement for the avatar for audio play on the directional speaker array such that the audio from the directional speaker array is directed in the determined audio direction.

It is appreciated that the directional speaker array may be implemented in a variety of different ways, depending on the implementation. In one contemplated approach, the directional speaker array comprises a sound bar including a plurality of speakers.

At the more detailed level, the invention comprehends various additional features. Any one or more of these various features may be used in various implementations of the invention. For example, the system may include a natural language interface for receiving input in the form of natural language.

In another example, the system may include a display device. The computer is configured to output the data representing the avatar for visual display on the display device such that the avatar orientation corresponds to the audio direction. The directional speaker array may be located proximate the display device such that the audio from the directional speaker array appears to the occupant to come from the avatar.

The computer may be configured to determine the audio direction such that the audio direction and the corresponding avatar orientation direct the audio and a gaze of the avatar toward a particular occupant being addressed. The computer may be configured to determine the audio direction such that the audio direction and the corresponding avatar orientation express an emotion by looking down and speaking, or by looking up and speaking at the occupant. The computer may configured to determine the audio direction such that the audio direction and the corresponding avatar orientation direct attention to an object by directing the audio and a gaze of the avatar toward the object.

In another aspect, embodiments of the invention may include a plurality of microphones. The computer may be configured to locate an occupant who is speaking. In more detail, the computer may be configured to determine the audio direction such that the audio direction directs the audio toward the located occupant.

BRIEF DESCRIPTION OF THE DRAWINGS

FIG. 2 illustrates an emotive advisory system for an automotive vehicle, including a directional speaker array;

FIG. 3 is a block diagram illustrating operation of an emotive advisory system in one embodiment of the invention;

FIG. 4 is a block diagram illustrating further more detailed aspects of operation of the emotive advisory system;

DETAILED DESCRIPTION

Embodiments of the invention comprehend an emotive advisory system (EAS) for use by one or more occupants of an automotive vehicle. In one approach to implementing the system, various vehicle interfaces in the automotive vehicle are consolidated into a single interface in the emotive advisory system (EAS).

In general, the emotive advisory system (EAS) for the automotive vehicle emotively conveys information to an occupant. The system receives input indicative of an operating state of the vehicle, transforms the input into data representing a simulated emotional state and generates data representing an avatar that expresses the simulated emotional state. The avatar may be displayed. The system may receive a query from the occupant regarding the emotional state of the avatar, and respond to the query. An example emotive advisory system and method is described in U.S. Pub. No. 2008/0269958.

Figure 1:
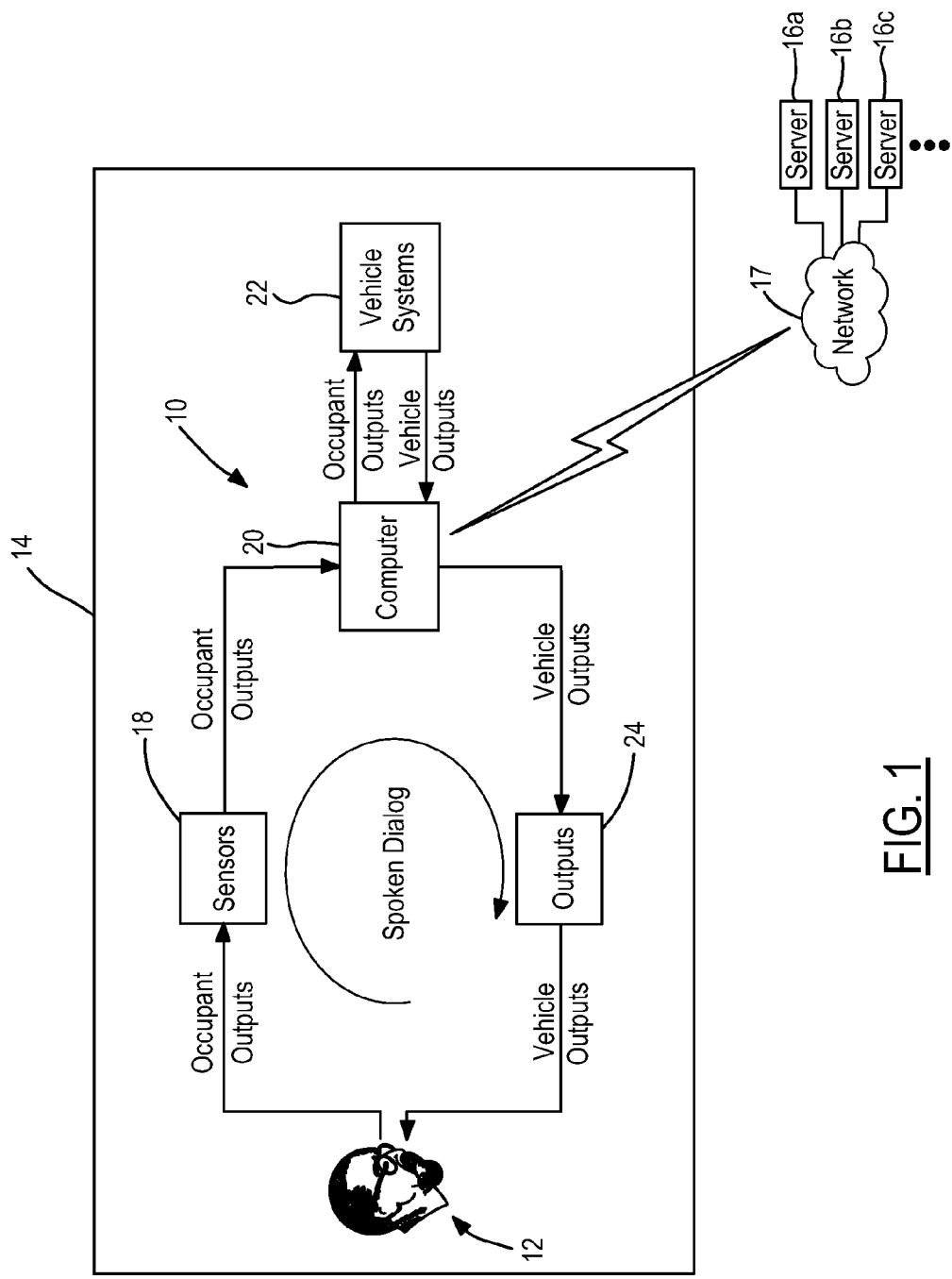
FIG. 1 is a block diagram of an emotive advisory system for an automotive vehicle, in one embodiment.

As shown in FIG. 1, an embodiment of an emotive advisory system (EAS) 10 assists an occupant/user 12 of a vehicle 14 in operating the vehicle 14 and in accessing information sources 16a, 16b, 16c, for example, web servers, etc., remote from the vehicle 14 via a network 17. Of course, other embodiments of the EAS 10 may be implemented within the context of any type of device and/or machine. For example, the EAS 10 may accompany a household appliance, handheld computing device, etc. Certain embodiments of the EAS 10 may be implemented as an integrated module that may be docked with another device and/or machine. A user may thus carry their EAS 10 with them and use it to interface with devices and/or machines they wish to interact with. Other configurations and arrangements are also possible.

In the embodiment of FIG. 1, sensors 18 detect inputs generated by the occupant 12 and convert them into digital information for a computer 20. The computer 20 receives these inputs as well as inputs from the information sources 16a, 16b, 16c and vehicle systems 22. The computer 20 processes these inputs and generates outputs for at least one of the occupant 12, information sources 16a, 16b, 16c and vehicle systems 22. Actuators/outputs, etc. 24 convert the outputs for the occupant 12 from a digital format into a format that may be perceived by the occupant 12, whether visual, audible, tactile, haptic, etc.

The occupant 12 may, in some embodiments, communicate with the EAS 10 through spoken dialog that follows rules of discourse (for example, Grice's maxims). For example, the occupant 12 may ask "Are there any good restaurants in the area?" In response, the EAS 10 may query appropriate information sources 16a, 16b, 16c and, together with geographic location information from the vehicle systems 22, determine a list of highly rated restaurants near the current location of the vehicle 14. The EAS 10 may answer with the simulated dialog: "There are a few. Would you like to hear the list?" An affirmative response from the occupant 12 may cause the EAS 10 to read the list.

The occupant 12 may also command the EAS 10 to alter certain parameters associated with the vehicle systems 22. For example, the occupant 12 may state "I feel like driving fast today." In response, the EAS 10 may ask "Would you like the drivetrain optimized for performance driving?" An affirmative response from the occupant 12 may cause the EAS 10 to alter engine tuning parameters for enhanced performance.

In some embodiments, the spoken dialog with the EAS 10 may be initiated without pressing any buttons or otherwise physically providing input to the EAS 10. This open microphone functionality allows the occupant 12 to initiate a conversation with the EAS 10 in the same way the occupant 12 would initiate a conversation with another occupant of the vehicle 14.

The occupant 12 may also "barge in" on the EAS 10 while it is speaking. For example, while the EAS 10 is reading the list of restaurants mentioned above, the occupant 12 may interject "Tell me more about restaurant X." In response, the EAS 10 may cease reading the list and query appropriate information sources 16a, 16b, 16c to gather additional information regarding restaurant X. The EAS 10 may then read the additional information to the occupant 12.

In some embodiments, the actuators/outputs 24 include a screen that selectively displays an avatar. The avatar may be a graphical representation of human, animal, machine, plant, vehicle, etc. and may include features, for example, a face, etc., that are capable of visually conveying emotion. The avatar may be hidden from view if, for example, a speed of the vehicle 14 is greater than a threshold which may be manufacturer or user defined. The avatar's voice, however, may continue to be heard. Of course, any suitable type of display technology, such as a holographic or head-up display, may be used.

The avatar's simulated human emotional state may depend on a variety of different criteria including an estimated emotional state of the occupant 12, a condition of the vehicle 14 and/or a quality with which the EAS 10 is performing a task, etc. For example, the sensors 18 may detect head movements, speech prosody, biometric information, etc. of the occupant 12 that, when processed by the computer 20, indicate that the occupant 12 is angry. In one example response, the EAS 10 may limit or discontinue dialog that it initiates with the occupant 12 while the occupant 12 is angry. In another example response, the avatar may be rendered in blue color tones with a concerned facial expression and ask in a calm voice "Is something bothering you?" If the occupant 12 responds by saying "Because of this traffic, I think I'm going to be late for work," the avatar may ask "Would you like me to find a faster route?" or "Is there someone you would like me to call?" If the occupant 12 responds by saying "No. This is the only way . . .," the avatar may ask "Would you like to hear some classical music?" The occupant 12 may answer "No. But could you tell me about the upcoming elections?" In response, the EAS 10 may query the appropriate information sources 16a, 16b, 16c to gather the current news regarding the elections. During the query, if the communication link with the information sources 16a, 16b, 16c is strong, the avatar may appear happy. If, however, the communication link with the information sources 16a, 16b, 16c is weak, the avatar may appear sad, prompting the occupant to ask "Are you having difficulty getting news on the elections?" The avatar may answer "Yes, I'm having trouble establishing a remote communication link."

During the above exchange, the avatar may appear to become frustrated if, for example, the vehicle 14 experiences frequent acceleration and deceleration or otherwise harsh handling. This change in simulated emotion may prompt the occupant 14 to ask "What's wrong?" The avatar may answer "Your driving is hurting my fuel efficiency. You might want to cut down on the frequent acceleration and deceleration." The avatar may also appear to become confused if, for example, the avatar does not understand a command or query from the occupant 14. This type of dialog may continue with the avatar dynamically altering its simulated emotional state via its appearance, expression, tone of voice, word choice, etc. to convey information to the occupant 12.

The EAS 10 may also learn to anticipate requests, commands and/or preferences of the occupant 12 based on a history of interaction between the occupant 12 and the EAS 10. For example, the EAS 10 may learn that the occupant 12 prefers a cabin temperature of 72° Fahrenheit when ambient temperatures exceed 80° Fahrenheit and a cabin temperature of 78° Fahrenheit when ambient temperatures are less than 40° Fahrenheit and it is a cloudy day. A record of such climate control settings and ambient temperatures may inform the EAS 10 as to this apparent preference of the occupant 12. Similarly, the EAS 10 may learn that the occupant 12 prefers to listen to local traffic reports upon vehicle start-up. A record of several requests for traffic news following vehicle start-up may prompt the EAS 10 to gather such information upon vehicle start-up and ask the occupant 12 whether they would like to hear the local traffic. Other learned behaviors are also possible.

These learned requests, commands and/or preferences may be supplemented and/or initialized with occupant-defined criteria. For example, the occupant 12 may inform the EAS 10 that it does not like to discuss sports but does like to discuss music, etc. In this example, the EAS 10 may refrain from initiating conversations with the occupant 12 regarding sports but periodically talk with the occupant 12 about music.

It is appreciated that an emotive advisory system (EAS) may be implemented in a variety of ways, and that the description herein is exemplary. Further more detailed description of an example emotive advisory system is provided in U.S. Pub. No. 2008/0269958. In general, with continuing reference to FIG. 1, computer 20 communicates with information sources 16a, 16b, 16c, and communicates with various peripheral devices such as buttons, a video camera, a vehicle BUS controller, a sound device and a private vehicle network. The computer 20 also communicates with a display on which the avatar may be rendered. Other configurations and arrangements are, of course, also possible.

FIG. 2 illustrates an emotive advisory system (EAS) 30 for an automotive vehicle, including a directional speaker array 32 in the form of a sound bar, in an example implementation. As an alternative to the sound bar, it is also possible to provide a mechanical vocal tract and physical vocal chord device. As shown, the conventional controls for entertainment, navigation, drivetrain, door locks, and HVAC in the center console are replaced with EAS controls. The top element is a touch display 34 with an avatar window, navigation and general function window, text window and a button window. Below the touch display 34 there is the directional speaker array 32 for synthetic speech from the avatar. This array 32 is close to the display 34 so the sounds of the avatar appear to the occupants of the vehicle to come from the avatar. The array 32 is also directional, so the voice changes direction when the avatar changes direction. This allows the avatar to address different people in the vehicle by directing the avatar's gaze and speech in the direction of the person it is addressing. In another example, the speech may originate from a particular location in the vehicle interior. For example, if the left rear door of the vehicle is open and the system is telling the driver that the door is open, the speech may be directed from an area near the left rear door. The avatar can express an emotion by looking down and speaking toward the floor, or by looking up and speaking at an individual. The avatar may also direct attention to an object like the navigation screen 34 by shifting its gaze and voice in that direction.

Embodiments of the invention may also take advantage of the vehicle's entertainment sound system that typically consists of four speakers, at each corner of the car interior and a subwoofer. The sound system is configured such that the speaker array may be used for the entertainment system along with the avatar voice, making the entertainment system effectively a 5.1 system.

Additional microphones 36 are placed within the passenger compartment to implement effects such as echo cancellation that make the avatar sound as though it is in a very large space or noise cancellation to ensure that passengers in the vehicle do not interfere with high priority dialog between the driver and the avatar. Noise cancellation is also used to prevent the avatar's voice from "barging in" on its speech recognition. Noise cancellation may also be enhanced using data from vehicle systems. For example, engine noise may be better eliminated using RPM from vehicle systems. Windshield wipers, vehicle speed, acceleration, HVAC and window position are other opportunities. The web could also be used to aid noise cancellation by determining weather conditions that may affect background noise such as rain or hail.

Further, additional microphones 36 make it possible for everyone in the vehicle to be heard by the avatar, and to localize every voice and determine if it is being directed toward the avatar. This helps EAS 30 determine if the voice is an occupant barging in, interrupting or an unrelated conversation. In more detail, microphones, speakers, baffles, etc., may be placed at various locations about the vehicle to allow the system to locate a speaking occupant. For example, a microphone located on the back of the front seat may be employed to allow the system to distinguish between front seat and back seat occupants.

In an example implementation, every 10 seconds or when a noise event takes place the sound system emits an impulse sound from a pattern of speakers. The impulse is short enough to be imperceptible, but sufficient for the system to calibrate a channel model of transmission from the speakers (including speakers 32) to the microphones (including microphones 36). From the received pulse, the travel time, attenuation, dispersion, echoes, etc. between each speaker and each microphone can be characterized.

In general, embodiments of the invention may normalize the vehicle acoustic environment so as to be comparable with the acoustic environment in which the automatic speech recognition systems are trained. For example, noise cancellation, which may be enhanced using data from vehicle systems, may cancel noise for, for example, wind noise from open windows, rainfall, and HVAC. Put another way, embodiments of the invention may normalize the audio inputs to improve speech recognition. It is appreciated that one purpose of the noise cancellation is to improve the speech recognition.

Further, in an example implementation, when the avatar moves back from the display surface 34 and into a closed area in the background such as a garage or a room, reverb may be added to produce the effect of being in a confined space. If the avatar moves back into an open area echo cancellation may be used to make the avatar sound like it is in an infinite space. When the avatar faces the navigation screen, reverb may be added to simulate the voice reflecting off the navigation display.

With these effects it is possible to make an avatar that can engage convincingly in a wide variety of activities, display emotion and meaning that can not be expressed with only prosody and semantics.

Figure 5:
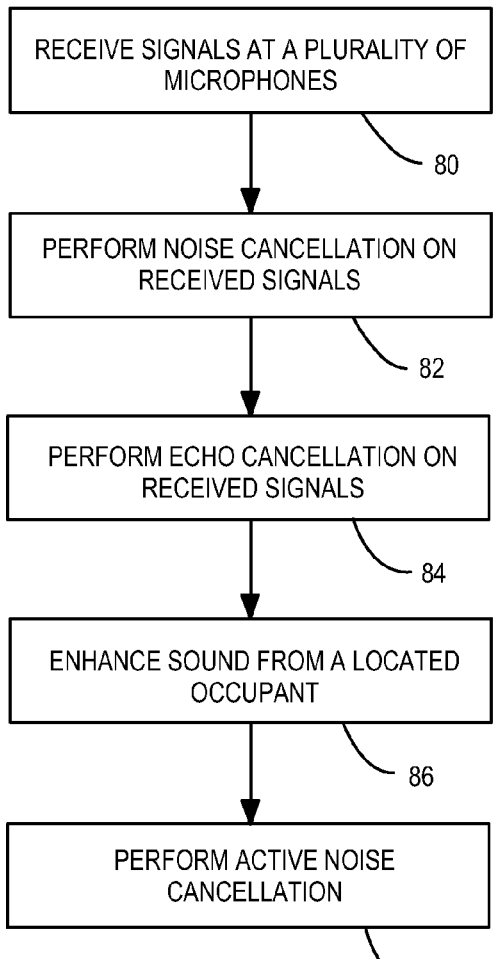
FIG. 5 is a block diagram illustrating further more detailed aspects of operation of the emotive advisory system.

FIGS. 3-5 are block diagrams illustrating operation of an emotive advisory system in one embodiment of the invention. In FIG. 3, at block 50, the EAS computer receives input indicative of an operating state of the vehicle and input indicative of an emotional state of an occupant. At block 52, the EAS computer generates data representing an avatar having an appearance and data representing a spoken statement for the avatar having at least one speech characteristic. The appearance and the at least one speech characteristic convey a simulated emotional state of the avatar to the occupant. The simulated emotional state depends on at least one of the operating state of the vehicle and the emotional state of the occupant.

At block 54, the data representing the avatar is output for visual display on a display device. At block 56, an audio direction is determined. At block 58, the data representing the statement for the avatar for audio play on the directional speaker array is output such that the audio from the directional speaker array is directed in the determined audio direction. In more detail, the avatar is displayed on the display device at block 54 such that the avatar orientation corresponds to the audio direction.

FIG. 4 illustrates more detailed aspects of operation. At block 60, signals are received at a plurality of microphones. At block 62, the EAS computer locates one or more occupants who are speaking. At block 64, the EAS computer determines which occupants, if any, are speaking to the avatar. Block 66 directs the audio and avatar gaze toward a located occupant. As shown at block 68, the avatar may express emotion by looking down and speaking or by looking up and speaking at the occupant. Finally, as depicted at block 70, the avatar may direct attention to an object by directing the audio and the avatar gaze toward an object.

FIG. 5 illustrates more detailed aspects of operation. Block 80 depicts receiving signals at a plurality of microphones. Block 82 depicts performing noise cancellation on received signals; block 84 depicts performing echo cancellation on received signals. At block 86, processing takes place such that sound from a particular located occupant is enhanced. Finally, and as depicted at block 88, embodiments of the invention may implement active noise cancellation.

Figure 6:
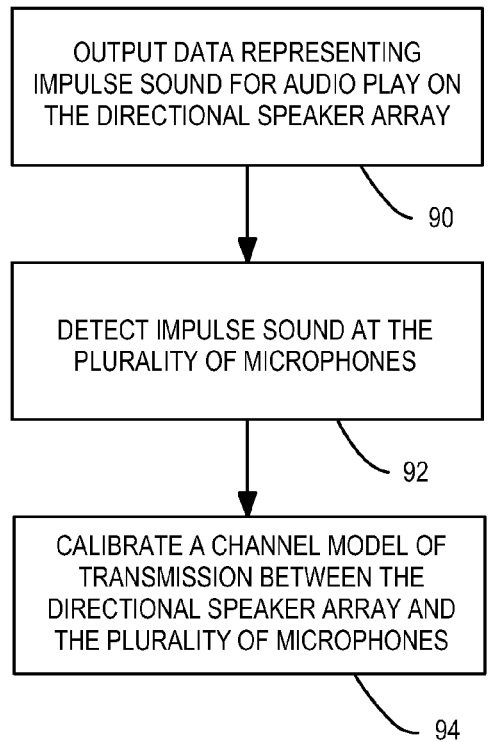
FIG. 6 is a block diagram illustrating a calibration technique for a channel model in the emotive advisory system.

FIG. 6 is a block diagram illustrating a calibration technique for a channel model in the emotive advisory system. At block 90, data representing an impulse sound is output for audio play on the directional speaker array. At block 92, the impulse sound is detected at the plurality of microphones. At block 94, a channel model of transmission between the directional speaker array and the plurality of microphones is calibrated.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An emotive advisory system for use by one or more occupants of an automotive vehicle, the system comprising:
   a display device;
   a directional speaker array; and
   a computer configured to
      receive input indicative of an operating state of the vehicle and input indicative of an emotional state of an occupant,
      generate (i) data representing an avatar having an appearance and (ii) data representing a spoken statement for the avatar having at least one speech characteristic, the appearance and the at least one speech characteristic conveying a simulated emotional state of the avatar to the occupant, the simulated emotional state depending on at least one of the operating state of the vehicle and the emotional state of the occupant,
      determine an audio direction,
      output the data representing the statement for the avatar for audio play on the directional speaker array such that the audio from the directional speaker array is directed in the determined audio direction, and
      output the data representing the avatar for visual display on the display device such that the avatar orientation corresponds to the audio direction, wherein the directional speaker array is located proximate to the display device such that the audio from the directional speaker array appears to the occupant to come from the avatar and wherein the audio direction is determined such that the audio direction and the corresponding avatar orientation direct attention of the occupant to an object by directing the audio and a gaze of the avatar toward the object.

2. The system of claim 1 wherein the directional speaker array comprises:
   a sound bar including a plurality of speakers.

3. The system of claim 1 further comprising:
   a natural language interface for receiving input in the form of natural language.

4. The system of claim 1 wherein the computer is configured to determine the audio direction such that the audio direction and the corresponding avatar orientation direct the audio and a gaze of the avatar toward a particular occupant being addressed.

5. The system of claim 1 wherein the computer is configured to determine the audio direction such that the audio direction and the corresponding avatar orientation express an emotion by looking down and speaking, or by looking up and speaking at the occupant.

6. The system of claim 1 further comprising:
   a plurality of microphones, wherein the computer is configured to locate an occupant who is speaking.

7. The system of claim 6 wherein the computer is configured to determine the audio direction such that the audio direction directs the audio toward the located occupant.

8. The system of claim 6 wherein the computer is configured to perform echo cancellation on signals received at the plurality of microphones.

9. The system of claim 6 wherein the computer is configured to perform noise cancellation on signals received at the plurality of microphones.

10. The system of claim 9 wherein the computer is configured to perform noise cancellation on signals received at the plurality of microphones to enhance sound from the located occupant.

11. The system of claim 1 further comprising:
    a plurality of microphones, wherein the computer is configured to locate one or more occupants who are speaking, and to determine which occupants, if any, are speaking to the avatar.

12. The system of claim 1 further comprising:
    a plurality of microphones, wherein the computer is configured to perform active noise cancellation based on signals received at the plurality of microphones by modifying audio from the directional speaker array.

13. The system of claim 1 further comprising:
    a plurality of microphones, wherein the computer is configured to:
       output data representing an impulse sound for audio play on the directional speaker array,
       detect the impulse sound at the plurality of microphones, and
       calibrate a channel model of transmission between the directional speaker array and the plurality of microphones.

14. The system of claim 1 wherein the computer is configured to determine the audio direction so as to provide an audio effect.

15. The system of claim 14 wherein the computer is configured to provide reverb.

16. An emotive advisory system for use by one or more occupants of an automotive vehicle, the system comprising:
a directional speaker array;
a display device; and
a computer configured to
receive input indicative of an operating state of the vehicle and input indicative of an emotional state of an occupant,
generate (i) data representing an avatar having an appearance and (ii) data representing a spoken statement for the avatar having at least one speech characteristic, the appearance and the at least one speech characteristic conveying a simulated emotional state of the avatar to the occupant, the simulated emotional state depending on at least one of the operating state of the vehicle and the emotional state of the occupant,
determine an audio direction,
output the data representing the statement for the avatar for audio play on the directional speaker array such that the audio from the directional speaker array is directed in the determined audio direction,
output the data representing the avatar for visual display on the display device such that the avatar orientation corresponds to the audio direction, and
locate an object in the vehicle,
wherein the audio direction is determined such that the audio direction and the corresponding avatar orientation direct the audio and a gaze of the avatar toward the object to direct attention of the occupant to the object.

17. A vehicle comprising:
A directional speaker array; and
A computer configured to:
Output data representing a spoken statement for audio play from the speaker array, and
output data representing an avatar for visual display, and
determine an audio direction,
output the data representing the statement for the avatar for audio play on the directional speaker array such that the audio from the directional speaker array is directed in the determined audio direction,
output the data representing the avatar for visual display on the display device such that the avatar orientation corresponds to the audio direction, and
locate an object in the vehicle
wherein the audio direction is determined such that the audio direction and the corresponding avatar orientation direct the audio and a gaze of the avatar toward the object to direct attention of the occupant to the object.

* * * * *